US011501348B1

(12) United States Patent
Jensen et al.

(10) Patent No.: US 11,501,348 B1
(45) Date of Patent: Nov. 15, 2022

(54) VIRTUAL CURRENCY IN A NATIVE APPLICATION ENVIRONMENT

(71) Applicant: Snap Inc., Santa Monica, CA (US)

(72) Inventors: John Jensen, Santa Monica, CA (US); Alan Rawcliffe, Seattle, WA (US); Cindy Yuqi Li, Seattle, WA (US); Kiran Abraham, Seattle, WA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 155 days.

(21) Appl. No.: 16/723,624

(22) Filed: Dec. 20, 2019

Related U.S. Application Data

(60) Provisional application No. 62/786,220, filed on Dec. 28, 2018.

(51) Int. Cl.
*G06Q 30/00* (2012.01)
*G06Q 30/06* (2012.01)
(Continued)

(52) U.S. Cl.
CPC ..... *G06Q 30/0613* (2013.01); *G06F 16/9536* (2019.01); *G06Q 20/065* (2013.01);
(Continued)

(58) Field of Classification Search
CPC .. G06Q 60/0613; G06Q 20/065; G06Q 20/12; G06Q 20/367; G06Q 30/0625; G06Q 30/0641; G06F 16/9536
(Continued)

(56) References Cited

U.S. PATENT DOCUMENTS 8,239,487 B1   8/2012   Hoffman et al.
8,707,394 B2 * 4/2014   Tam .................. G06Q 30/06
                                              726/3
(Continued)

FOREIGN PATENT DOCUMENTS

WO    WO-2011041467 A2    4/2011

OTHER PUBLICATIONS

Chang, Tao-Ku. "A secure operational model for mobile payments." TheScientificWorldJournal vol. 2014 (2014): 626243. doi: 10.1155/2014/626243 (Year: 2014).*
(Continued)

*Primary Examiner* — Anand Loharikar
(74) *Attorney, Agent, or Firm* — Schwegman Lundberg & Woessner, P.A.

(57) ABSTRACT

Embodiments disclosed provide a virtual currency system within a messaging application by performing operations comprising: launching, within a messaging application, a third-party application; receiving, by the messaging application from the third-party application, a request to perform an ecommerce transaction in relation to an item available for consumption on the third-party application; determining, by the messaging application, an expected attribute for the item based on accessing a database that stores expected attribute information for multiple items; verifying, by the messaging application, that an attribute of the item specified by the request corresponds to the expected attribute for the item; and processing, by the messaging application, the ecommerce transaction in response to successfully verifying that the attribute of the item satisfies a verification criterion based on the expected attribute for the item.

20 Claims, 16 Drawing Sheets

(51) Int. Cl.
  *G06Q 20/06* (2012.01)
  *G06Q 20/12* (2012.01)
  *G06Q 20/36* (2012.01)
  *G06F 16/9536* (2019.01)

(52) U.S. Cl.
  CPC ........... *G06Q 20/12* (2013.01); *G06Q 20/367* (2013.01); *G06Q 30/0625* (2013.01); *G06Q 30/0641* (2013.01)

(58) Field of Classification Search
  USPC .............................................. 705/26.1–27.2
  See application file for complete search history.

(56) References Cited

U.S. PATENT DOCUMENTS

| | | | |
|---|---|---|---|
| 2013/0006736 A1 | 1/2013 | Bethke et al. | |
| 2013/0344932 A1 | 12/2013 | Adams et al. | |
| 2014/0141864 A1 | 5/2014 | Ward et al. | |
| 2016/0035178 A1 | 2/2016 | Judkins et al. | |
| 2016/0048250 A1 | 2/2016 | Thakkar et al. | |
| 2017/0076262 A1 | 3/2017 | Xing | |
| 2017/0148267 A1 | 5/2017 | Parker | |
| 2017/0316414 A1* | 11/2017 | Doran | G06Q 20/386 |
| 2018/0013765 A1 | 1/2018 | Brown et al. | |
| 2018/0102018 A1 | 4/2018 | Cage et al. | |
| 2018/0300050 A1 | 10/2018 | Mulcahy et al. | |
| 2018/0350144 A1 | 12/2018 | Rathod | |
| 2018/0367483 A1 | 12/2018 | Rodriguez et al. | |

OTHER PUBLICATIONS

"U.S. Appl. No. 16/422,063, Advisory Action dated Mar. 16, 2022", 3 pgs.

"U.S. Appl. No. 16/422,063, Final Office Action dated Jan. 7, 2022", 28 pgs.

"U.S. Appl. No. 16/422,063, Non Final Office Action dated Jun. 9, 2022", 29 pgs.

"U.S. Appl. No. 16/422,063, Non Final Office Action dated Jul. 14, 2020", 33 pgs.

"U.S. Appl. No. 16/422,063, Response filed Feb. 16, 22 to Final Office Action dated Jan. 7, 2022", 12 pgs.

"U.S. Appl. No. 16/422,063, Response filed Oct. 12, 20 to Non Final Office Action dated Jul. 14, 2020", 11 pgs.

Sharp, C. E., et al., "online games and business: Architecture for integrating business models and services into online games", IBM Systems Journal, vol. 45, Issue: 1, (Jan. 1, 2006), 161-179.

"U.S. Appl. No. 16/422,063, Response filed Sep. 8, 2022 to Non Final Office Action dated Jun. 9, 2022", 12 pgs.

* cited by examiner

| A | B | C | D | E | F | G | H | I | J |
|---|---|---|---|---|---|---|---|---|---|
| BundleID | Transaction ID | Token Class | Token Count | Locale | Local Currency Value Per Token (Gross) | Local Currency Value Per Token (Net) | Local Currency | USD Value Per Token (Net) | Creation Date |
| xxxxxxxx | yyyyyyyyyy | Token_P | 100 | US | 0.0198 | 0.01386 | USD | 0.0198 | 1/12/2018 |
| xxxxxxxx | yyyyyyyyyy | Token_P | 75 | UK | 0.0198 | 0.01129 | GBP | 0.01583 | 1/26/2018 |
| xxxxxxxx | yyyyyyyyyy | Token_F | 201 | US | 0 | 0 | USD | 0 | 1/2/2018 |
| xxxxxxxx | yyyyyyyyyy | Token_E | 15 | FR | 0.01386 | 0.01386 | USD | 0.01386 | 1/2/2018 |

VIRTUAL CURRENCY IN A NATIVE APPLICATION ENVIRONMENT

CROSS-REFERENCE TO RELATED APPLICATION

The present disclosure claims the benefit of U.S. Provisional Application No. 62/786,220, filed Dec. 28, 2018, which is hereby incorporated by reference in its entirety.

TECHNICAL FIELD

The present disclosure generally relates to the technical field of virtual currency. In particular, the disclosed embodiments provide for virtual currency within a social network.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 8 shows an example virtual currency wallet in at least one embodiment of the disclosure.

DETAILED DESCRIPTION

Figure 1:
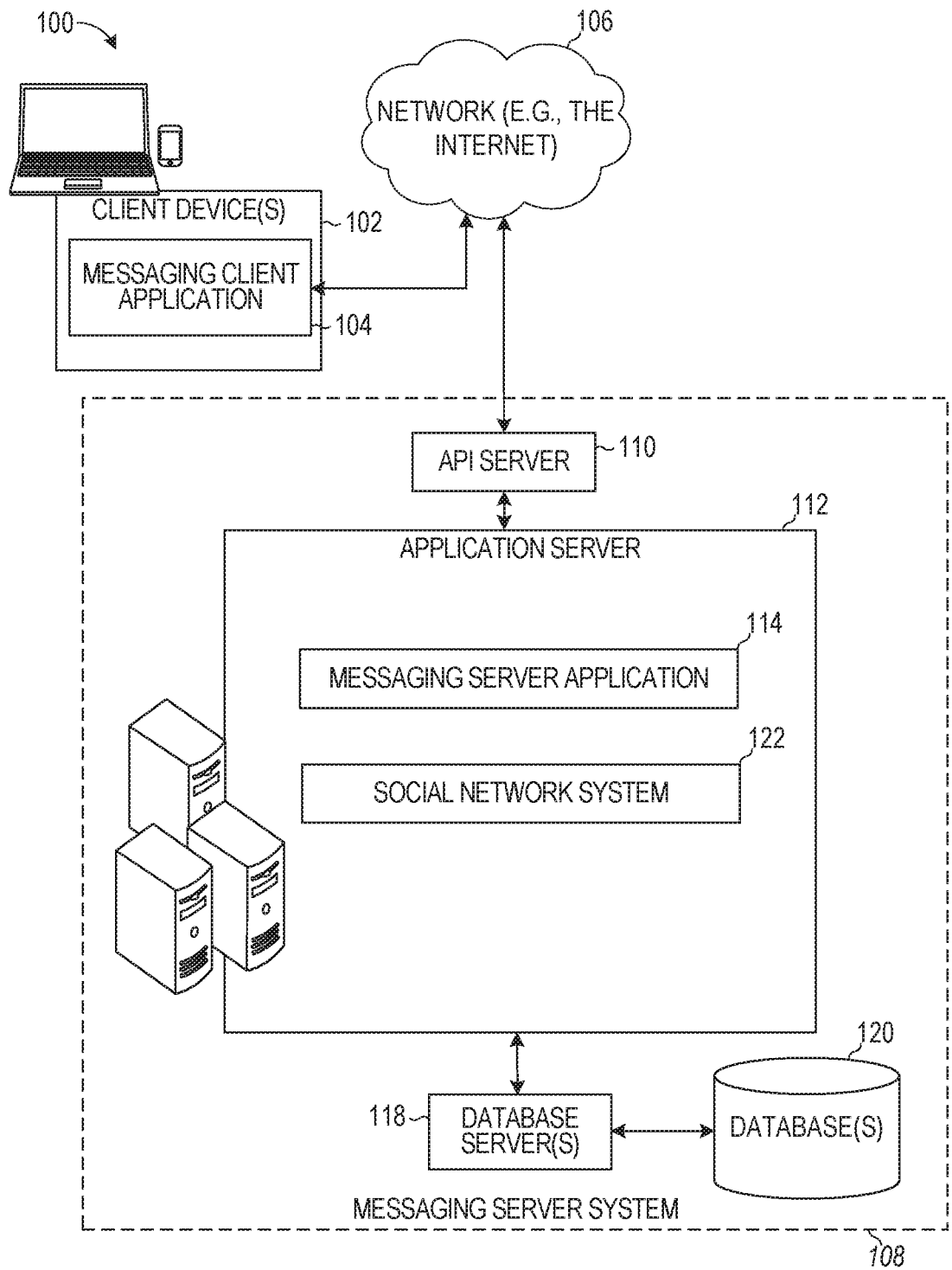
FIG. 1 is a block diagram showing an example messaging system for exchanging data (e.g., messages and associated content) over a network, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The disclosed embodiments provide a virtual currency system within a native application, such as a messaging application. The native application may be considered to be an application that interfaces directly with an operating system of a mobile device. This contrasts with a web view of a hosted application or third-party application, which runs within an encapsulated environment, such as a web browser. The native application is used to launch and interface with the third-party application and enables a user to purchase items on the third-party application using a virtual wallet that is maintained by the native application, such as the messaging application.

Many mobile device operating systems already provide an ecommerce interface. The ecommerce interface facilitates electronic commerce by applications running on the mobile device. For example, a particular application may provide for the purchase of additional features within an application. To enable one or more features, the user may agree to pay a predefined amount for the features. To make payment, the user interfaces with a payment system running within the operating system of the device or hosted by the particular application. After payment is made, the particular application may then provide the purchased features.

The disclosed embodiments represent an improvement to this model by enabling a user to purchase items on third-party applications, such as web-based or web-view applications, using virtual currency stored in a wallet maintained by a native application, such as a messaging application. Specifically, the disclosed embodiments enable a user to purchase items on third-party applications that may not necessarily be fully trustworthy. For example, the applications may be written in a non-secure language, such as Hypertext Markup Language 5 (HTML5), which may present one or more security vulnerabilities. Namely, an application written in HTML5 may be edited in an unsecure manner, such that it may not be practical to trust any operations the application may attempt. To mitigate against this risk while still providing the applications with an ability to perform purchase transactions, the disclosed embodiments improve the functioning and operation of the device by providing an interface to the web-based applications running in a web view allowing a user to complete purchase transactions using a messaging application trusted by the user. This avoids the need for the user to directly provide payment information to the third-party applications and reduces the risk of the user's personal information and security being compromised by the third-party application.

In some embodiments, the user interacts directly with a messaging application to purchase and add tokens to the user's virtual wallet maintained by the messaging application. The messaging application launches a third-party application, such as a web-view application. The user can select an item in the third-party application to purchase and in response, the third-party application sends a request to the messaging application to complete an ecommerce transaction for the item. The messaging application verifies one or more attributes of the item, such as a cost, and then deducts funds or tokens from the user's virtual wallet based on the attributes of the item. Once the messaging application successfully deducts the funds and completes the purchase of the item, the messaging application sends a message to the third-party application to enable the user to consume the item on the third-party application. In this way, the third-party application can allow a user to purchase items without directly requesting or processing payment from the user. Namely, all payment information for items requested to be purchased on a third-party application is maintained and processed by the messaging application that the user trusts to be secure. Accordingly, the risk of the third-party application compromising the user's payment information and credentials is reduced, which enhances and improves the security and functioning of the computing system.

FIG. 1 is a block diagram showing an example messaging system 100 for exchanging data (e.g., messages and associated content) over a network. The messaging system 100 includes multiple client devices 102, each of which hosts a number of applications including a messaging client application 104 and one or more third-party applications (not shown). Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box (STB), or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

Each messaging client application 104 is also able to communicate with one or more web-based gaming application servers (not shown) (e.g., third-party application servers). Each web-based gaming application server hosts, for example, an HTML5-based game. Particularly, the messaging client application 104 launches a web-based game (or other third-party application) by accessing the HTML5 file from the web-based gaming application server associated with the game and executing the file. The web-based gaming application is presented within the user interface of the messaging application and without leaving the messaging application or switching focus or display of the messaging application. In certain embodiments, the games hosted by the web-based gaming application server are programmed in JavaScript leveraging a software development kit (SDK) provided by the messaging server system 108. The SDK includes application programming interfaces (APIs) with functions that can be called or invoked by the web-based gaming application. In certain embodiments, the gaming application platform includes a JavaScript library that provides a given gaming application access to certain user data of the messaging client application 104. HTML5 is used as an example technology for programming games, according to some embodiments, but games programmed based on other technologies can be used. The disclosure pertaining to web-based gaming applications applies similarly to any other type of web-based application, such as web-based third-party applications.

In order to integrate the functions of the SDK into the game (or third-party application), the SDK is downloaded by the web-based gaming application server from the messaging server system 108 or is otherwise received by the web-based gaming application server. Once downloaded or received, the SDK is included as part of the application code of the web-based game. The code of the web-based game can then call or invoke certain functions of the SDK to integrate features of the messaging client application 104 into the web-based gaming application.

The SDK stored on the gaming application platform 124 effectively provides the bridge between the web-based gaming application (or third-party web-based application) and the messaging client application 104. This provides the user with a seamless experience of communicating with their friends on the messaging client application 104, thereby preserving the look and feel of the messaging client application 104, while playing a web-based gaming application and purchasing items on the web-based gaming application. To bridge the web-based gaming application and the messaging client application 104, in certain embodiments, the SDK facilitates communication between the web-based gaming application server and the messaging client application 104. In certain embodiments, a WebViewJavaScript-Bridge running on a client device 102 establishes two one-way communication channels between the web-based gaming application and the messaging client application 104. Messages are sent between the web-based gaming application and the messaging client application 104 via these communication channels asynchronously. Each SDK function invocation is sent as a message, and callback for each SDK function is implemented by constructing a unique callback identifier and sending a message with that callback identifier.

By utilizing the SDK, not all of the information from the messaging client application 104 is shared with the web-based gaming application server. The SDK limits which information is shared based on the needs of the web-based gaming application and based on a context from which the web-based gaming application was launched by the messaging client application 104.

In certain embodiments, each web-based gaming application server provides the HTML5 file corresponding to the web-based gaming application to the messaging server system 108. The messaging server system 108 can add a visual representation of the game in the messaging client application 104. Once the user selects the visual representation or instructs the messaging client application 104 through a GUI of the messaging client application 104 to launch the game (or other web-based application), the messaging client application 104 obtains the HTML5 file and initiates all the resources necessary to launch the game. In some cases, the messaging client application 104 accesses the corresponding web-based gaming application server to launch the game.

Via the SDK of the messaging client application 104, the web-based gaming application can request purchase transactions to be performed by the messaging client application 104. For example, the SDK may provide an API which the web-based gaming application can use to call functions to perform purchase transactions. Namely, the web-based gaming application may receive a user request to purchase an item in the web-based gaming application. The web-based gaming application may call an API function which provides various information (e.g., an identifier of the web-based gaming application, an identifier of the item being purchased, a cost of the item being purchased, a region, an identifier of the user, and so forth) to the messaging client application 104. The messaging client application 104 can process the received information to verify that the item being purchased is authorized. For example, the messaging client application 104 may maintain a list of all items available for purchase by web-based gaming applications along with their respective expected costs. The messaging client application 104 may compare the cost and identity of the item received in the purchase request to the expected costs of the item maintained by the messaging client application 104. In response to determining that the received cost from the web-based gaming application satisfies a verification criterion based on the expected cost (e.g., matches the expected cost or is within a predefined range of the expected cost), the messaging client application 104 may proceed to process the transaction. In some embodiments, the messaging client application 104 presents a confirmation or prompt to the user identifying the item and cost that was received from the web-based gaming application. In response to receiving input from the user confirming the purchase, the messaging client application 104 proceeds to process the transaction.

Specifically, the messaging client application 104 may access a virtual wallet maintained for the user by the messaging client application 104 and determine whether a sufficient number of tokens are available for use in the virtual wallet for completing the purchase transaction. As an example, the messaging client application 104 may determine whether the balance in the virtual wallet exceeds the cost of the item being requested to be purchased by the web-based gaming application. If the balance exceeds the cost, the messaging client application 104 may deduct the cost of the item in tokens from the virtual wallet and generate a purchase transaction identifier. The purchase transaction identifier may identify the time at which the purchase was made, a unique identifier of the purchase transaction, an identifier of the application, and/or identifier of the item that was purchased. The messaging client application 104 may return a message that includes the purchase transaction identifier to the web-based gaming application indicating that the purchase transaction completed successfully. The messaging client application 104 may also store, in a messaging client application, server data that identifies the purchase transaction and marks the transaction as unconsumed. If the balance does not exceed the cost, the messaging client application 104 returns a message to the web-based gaming application indicating that the user does not have sufficient funds and prevents the web-based gaming application from completing the transaction. In an embodiment, the messaging client application 104 navigates the user to a user interface of the messaging client application 104 to allow the user to purchase additional tokens to complete the transaction. If the user purchases additional tokens, the messaging client application 104 returns to the process of completing the transaction by determining if the virtual wallet balance exceeds the cost of the item.

In response to receiving the purchase transaction identifier, the web-based gaming application performs a process to consume the item being requested. As an example, the web-based gaming application communicates the received purchase transaction identifier via an API function call with a messaging client application server. The server may verify that the data in the purchase transaction identifier is valid. Namely, the server may verify that the purchase transaction matches a previously stored purchase transaction identifier that is maintained by the server. For example, the server may access purchase transactions associated with the web-based gaming application and determine whether a purchase transaction identifier received from the web-based gaming application matches one or more of the purchase transaction identifiers stored for the web-based gaming application. If a match is found, the server determines whether the matching purchase transaction is marked as unconsumed. In response to determining that the purchase transaction is unconsumed, the server returns a success message to the web-based gaming application and marks the purchase transaction as consumed. The web-based gaming application can then make the item being purchased by the user available for consumption and use in the web-based gaming application. In response to determining that the purchase transaction is consumed, the server returns a message to the web-based gaming application indicating that the item is a duplicate purchase and prevents the web-based gaming application from consuming the item again.

Any operation and/or action discussed above and below as being performed by the messaging client application 104 may alternatively or in addition be performed by application server 112. In some embodiments, actions are divided between being performed by the messaging client application 104 running on a user device and being performed by the application server 112.

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long- Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
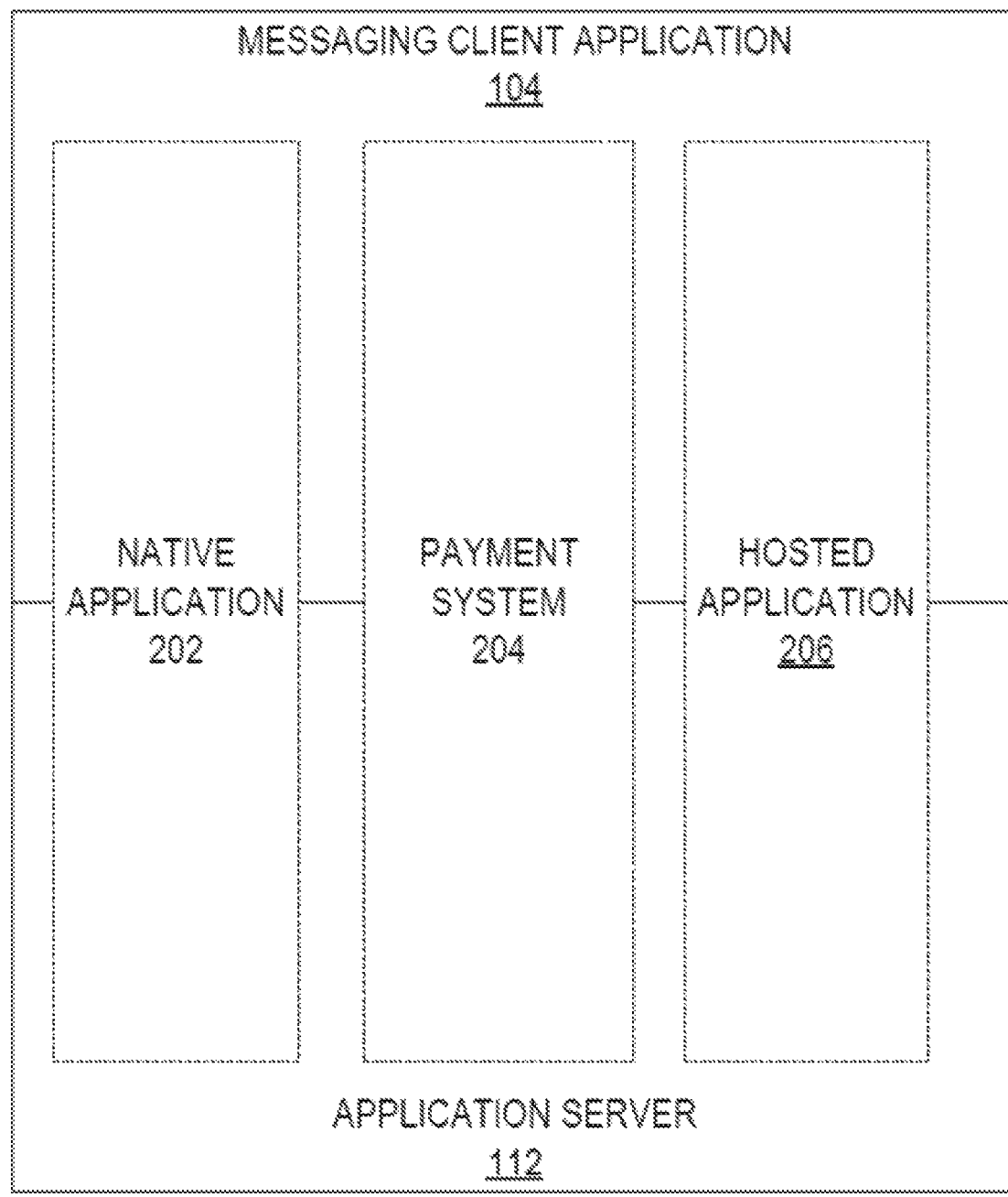
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely a native application 202, payment system 204, and hosted application 206.

The native application 202 may perform primary functions of the messaging client application, and functions as a master controller for implementation of a virtual currency system within the messaging client application 104. The payment system 204 may implement an independent payment system to facilitate ecommerce transactions within the messaging client application 104. The payment system 204 may interface with a payment system implemented by an operating system running on the client device 102 and/or on application server 112. The hosted application 206 may run within a separate security domain when compared to the security domain of the native application 202. The hosted application 206 may run within a web view in some embodiments and may implement or provide an interface to a third-party application or web-based gaming application. The hosted application 206 may interface with the payment system 204 to accomplish ecommerce transactions within the messaging client application 104, without necessarily engaging the payment system implemented as part of the operating system discussed above.

Figure 3:
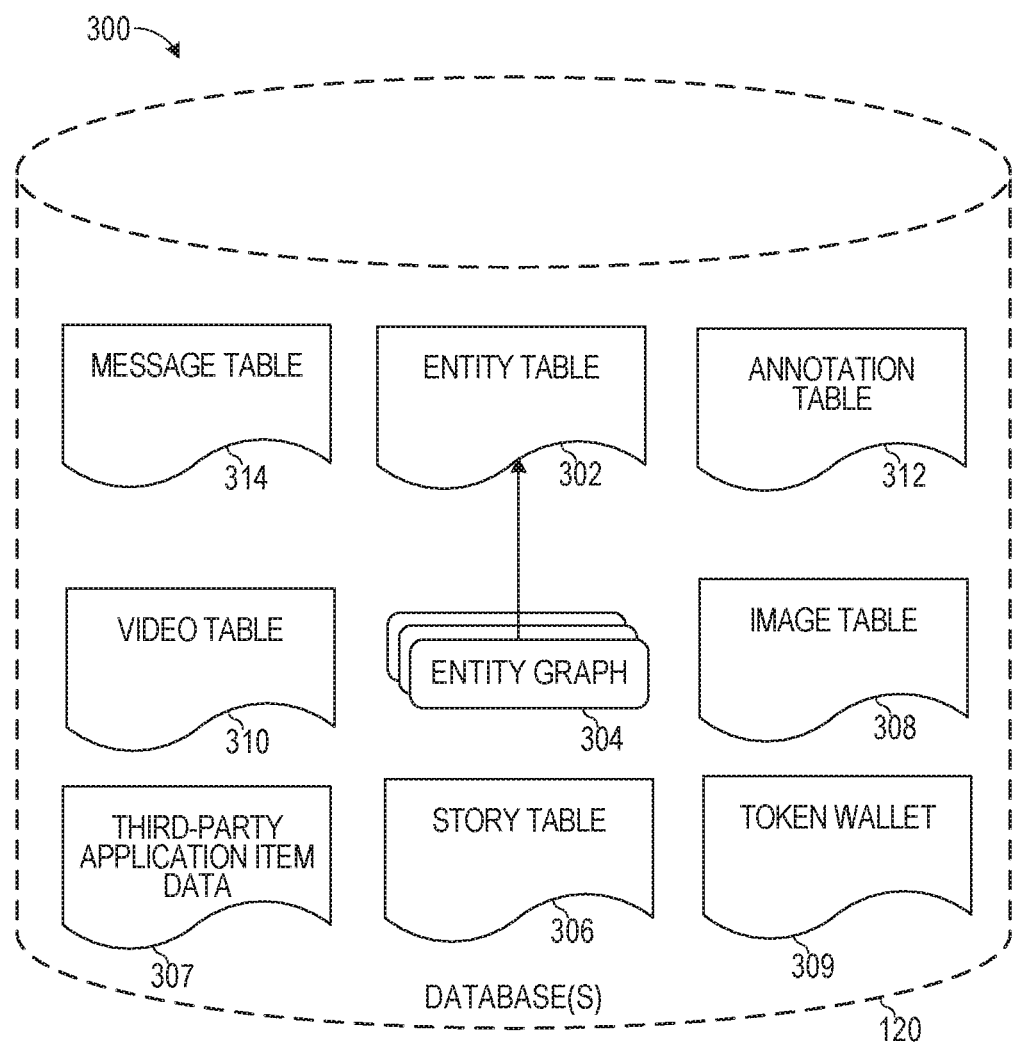
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Prior to launching a game (or third-party application) with in-application purchase capability, a game developer may register and configure goods or items available for purchase within the game using an Inventory Management System (IMS). Such information is stored as third-party application item data 307. For each sellable item, a developer may specify the following: a third-party application identifier; an enabled/disabled indication that controls whether the item is currently available for sale; an icon asset indication, which provides an icon to be used in-game and checkout flow; a title to be used in-game and checkout flow; a short description to be used in-game and checkout flow; an item identifier to be used in-game and checkout flow; a price tier indication, which defines a pricing tier or cost, with fixed localization of pricing by country; a countries enabled indication, which indicates which countries are enabled or disabled for the item; localized languages (per language): localization options for predefined list of supported languages; language specific title: this is a translated title for a selected language to be used in-game and checkout flow; a country specific description for a selected language to be used in-game and checkout flow; and an item version number, which increments with every update to a mutable field. For each item, third-party application item data 307 may store purchase information including: the identifier of the third-party application, user identifier, purchase transaction identifier, and a consumed or unconsumed status.

The messaging client application 104 may maintain a token wallet 309 for each user of the messaging client application 104. The token wallet 309 stores a table (shown in FIG. 8) that identifies various subsets of tokens available for a user to consume. In some embodiments, each subset of tokens is associated with a particular token class of various token classes. For example, the token classes may include paid tokens, promotional tokens, earned tokens, and sponsored (by a third party) tokens. Earned tokens may be provided to users in exchange for predetermined engagement activities in a core application, such as sharing content with friends in a messaging client application 104.

To purchase tokens from a native storefront of the messaging client application 104, the user navigates to the storefront by entering their profile and selecting an option to access a storefront. After entering the storefront, the messaging client application 104 presents a GUI with several packages of tokens. Each package can be selected for purchase. Selecting any token package may immediately direct the user to a native checkout service of the messaging client application 104. Tokens purchased by the user via certain packages using the messaging client application 104 are associated with the paid tokens class in the token wallet 309.

To add purchased tokens to the wallet, the messaging client application 104 calls a CreditWallet API function. In the API function call, the messaging client application 104 includes the user identifier, credit amount, purchase value (in gross local currency), purchase value (in net local currency), purchase currency, purchase Value (in net U.S. dollars), transaction identifier (TransactionID), user locale, token Class (paid token (Token.P)/promotional token (Token.F)/ earned token (Token.E)), and an expiration date (optionally) for free or earned tokens only. In response to receiving the request from the messaging client application 104, the wallet service of the application server creates and adds a new bundle entry into the wallet 309 which includes: BundleID: ID for the unique purchase OR for the unique class+value combination, Token Class, TransactionID, and user locale. In some embodiments, the user locale is derived from the operating system purchase locale. Local currency Value per Token (gross) is the gross amount charged in the store, in user locale currency; Local currency Value per Token (net) is the net amount payable which may be country dependent (e.g., generally 70% of gross, but may be less for countries that charge taxes (~58%)); Local Currency is the transacting currency; USD Value per Token is Converted net amount per token, with currency conversion occurring at the time of bundle purchase; creation date is the bundle purchase/creation timestamp.

FIG. 8 shows an illustrative wallet that retains a collection of user tokens. Each user identifier (UUID) has its own wallet. Under the classes of tokens described above, tokens may be stored according to the following: Paid Tokens: these tokens are stored at the original purchase bundle level. A single transaction for a particular purchase price may be recorded as a single entry. For promotional or free tokens, these are stored as a unique bundle balance for each creation event. In some embodiments, a new user may receive an initial bundle amount and possible additional promotional bundles at year end or other time period. Earned tokens are stored as unique bundles depending on a value assigned at the time the token(s) are earned. This may be captured as a single bundle with all tokens carrying the same value. Each unique sponsorship of tokens may result in a unique bundle of tokens. To manage tokens, the data received by the request through the CreditWallet API function call may be stored in the token wallet 309 as shown in different rows of the table of FIG. 8.

Figure 4:
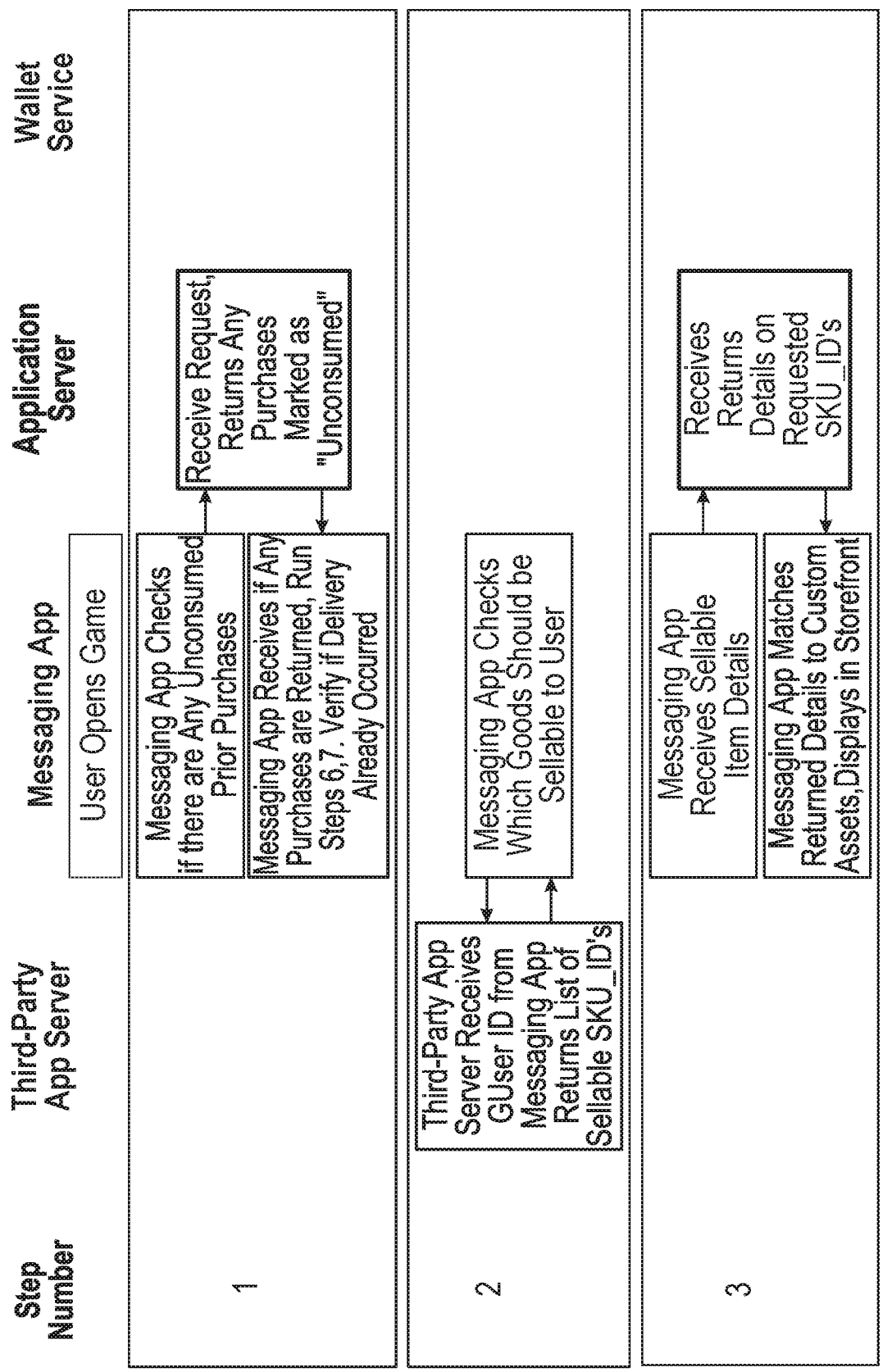
FIGS. 4 and 5A-B show an overview of a purchase flow, according to some embodiments.
Figure 5A:
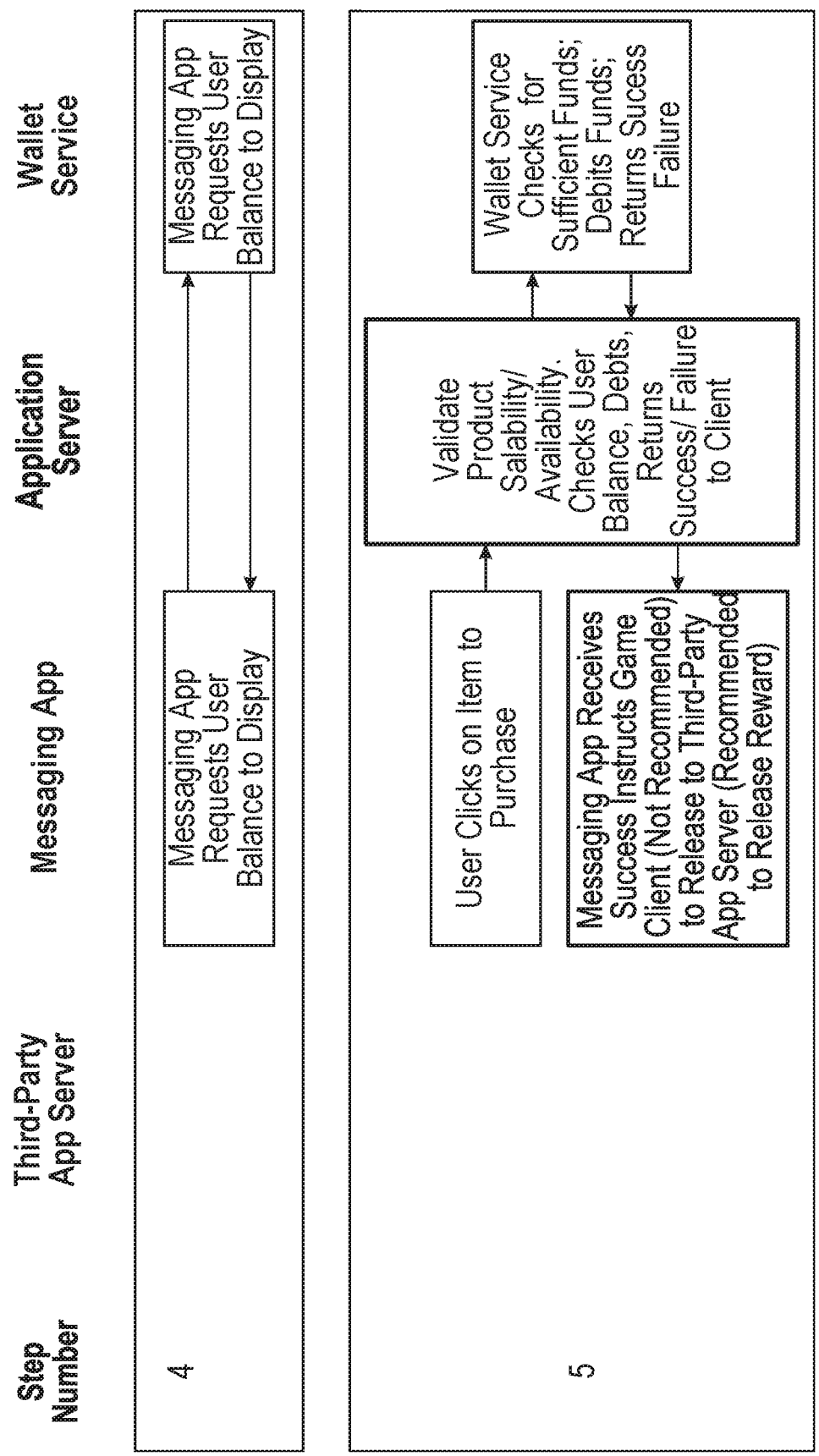
Figure 5B:
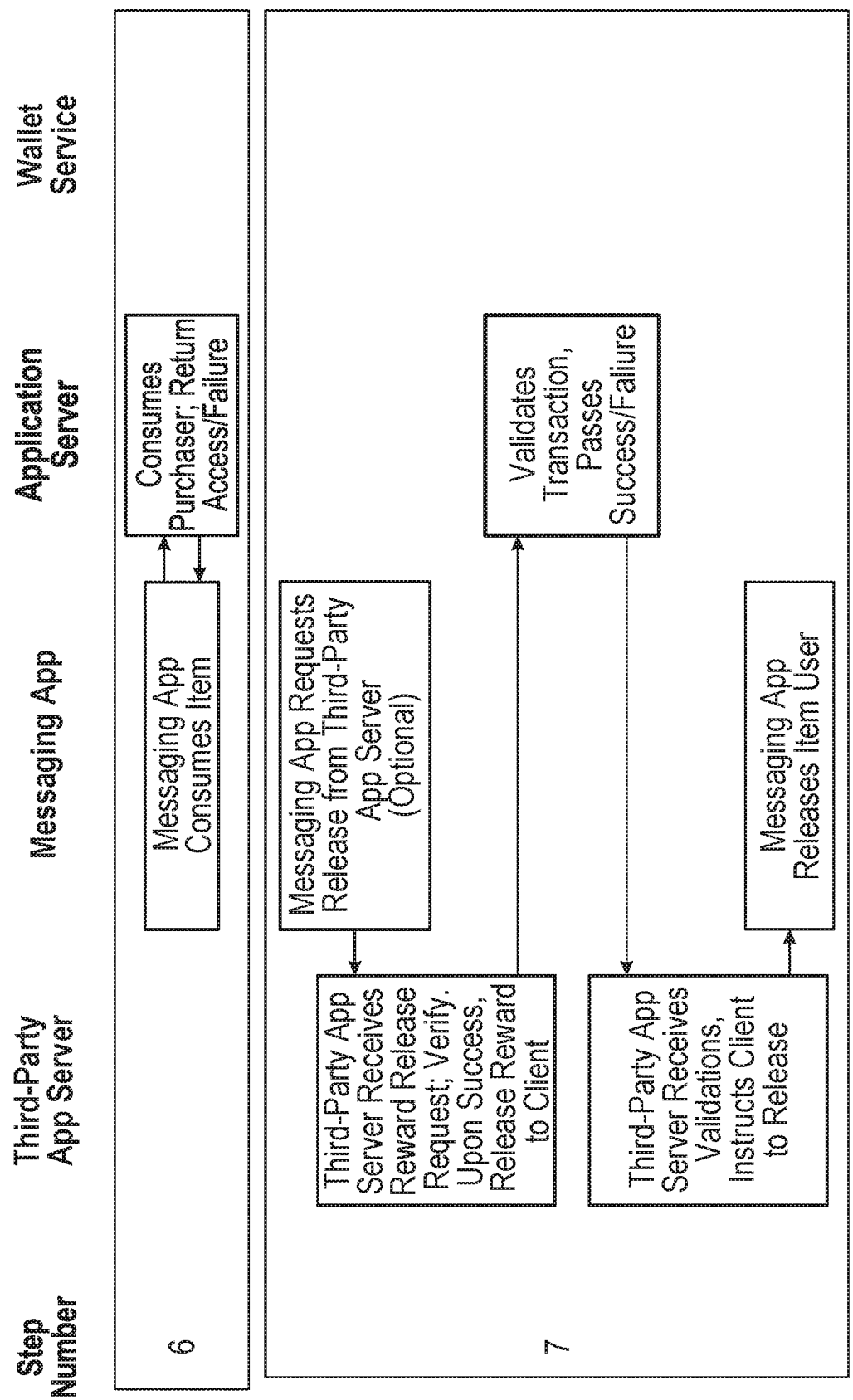

FIGS. 4 and 5A-B show an overview of a purchase flow. After a user selects an identifier within the messaging client application 104 to launch a web-based gaming application or other third-party application, the messaging client application 104 launches the web-based gaming application or third-party application in a web-view. After the third-party application is launched, the third-party application determines what items are available for sale and presents a GUI allowing the user to purchase such items. This process will be achieved in Steps 1-3 shown in FIG. 4. In some embodiments, after being launched, the third-party application checks with the application server 112 if any items are left unconsumed (blocking repurchase), determines what virtual items to display to the user, and requests and retrieves validated/approved titles, descriptions, and assets. Specifically, the third-party application communicates an identifier of the third-party application with application server 112. The server 112 access the third-party application item data 307 for the identifier of the third-party application to determine whether any items are associated with an unconsumed status. If any items are associated with the unconsumed status, the server 112 notifies the third-party application of the item identifiers that are associated with the unconsumed status. In some cases, the server 112 returns a response to the third-party application (when queried by the third-party application for a list of unconsumed items) containing item information including a project identifier, TransactionID, item identifier, Item Version, Transaction_Time, ConsumptionStatus, and/or Price.

The third-party application may then retrieve a purchase transaction identifier information for the unconsumed items and provide the purchase transaction identifier to the server 112. In response to the server 112 determining that the purchase transaction identifier matches the purchase transaction identifier of the unconsumed item, the server 112 marks the item as consumed and enables the third-party application to consume and provide the item to the user. In some embodiments, any item identifier stored in item data 307 that has previously been purchased but not consumed will not be purchasable again even if the item is valid and live. These operations are outlined below in Step 6 and Step 7 of FIG. 5B.

The third-party application may also load into the storefront for purchasing other non-virtual currency-sellable items, such as previously purchased goods, gated/locked items, or tertiary items (purchasable with a secondary in-game currency). However, such assets (including title, description, icon) may be controlled and provided by the third-party application, and may not match anything actively available for sale (but can match an item in item data 307 that is marked as disabled).

To retrieve item details, a third-party application may request inventory detail from the messaging client application 104 through a GetItemDetails API function call. For each unique item, the messaging client application 104 may send one or more of ProjectID, ItemID, User_locale. An inventory endpoint receives a request. The messaging client application 104 verifies for each ItemID whether the item is valid for sale by checking the corresponding status in item data 307. For example, the status in item data 307 may indicate the itemID is enabled or disabled. A country status of the item may indicate the country is matched to the user_locale. The following is then retrieved for each ItemID: ItemID, Item_Version, Localized_Title, Localized_Description, Localized_Price, Icon Asset.

The third-party application receives the response from the messaging client application 104 and matches assets for display in the storefront.

In some embodiments, the messaging client application 104 or third-party application may check and display a user balance. In some implementations, only the messaging client application 104 may display the user balance by accessing the total amount of tokens available in the token wallet 309 for the user. The total amount of tokens may be an aggregated sum across all subsets of tokens irrespective of their corresponding class. In some embodiments, the class of tokens remains hidden from view for the user. In some cases, the balance of the token wallet 309 is always displayed when a user views a storefront but the balance is not revealed to the third-party application. Namely, a GUI of the messaging client application 104 that represents the wallet balance for the user may be overlaid automatically on top of a GUI of the third-party application which includes a storefront. For example, whenever the user accesses a storefront of the third-party application, the third-party application may generate and send a request to the messaging client application 104 to display the user balance of the token wallet 309. When the user exists the storefront, the third-party application may instruct the messaging client application 104 to remove the display of the user balance.

In some embodiments, after steps 1-4 are completed, the user may access a storefront in the web-based gaming application with sellable items. In some embodiments, the messaging client application 104 presents the balance of the token wallet 309 at the top. Below the balance of the token wallet 309, the third-party application presents items of the storefront together with their costs in the local currency of the user.

In some embodiments, the messaging client application 104 presents a token balance in the token wallet 309 for the user and determines whether any promotions are available. To determine if any promotions are available, the messaging client application 104 sends a user identifier to a promotion system and checks if any promotions are available to the user. The promotion system can check if any offers are available for the current date (e.g., whether an offer is associated with a start and end date within which the current date falls). The promotion system may check if the user has previously received or consumed the promotion that is available and if not, may update the wallet to add tokens associated with the promotion.

In response to determining that there is a promotion available, the messaging client application 104 retrieves graphical elements (e.g., animations, overlays, notifications) associated with the promotion that is available. The graphical elements are presented together with the token balance. The user can select or interact with the graphical elements to consume the promotion and in response, a new promotion token bundle or subset associated with the promotion that is available is added to the token wallet 309.

Figure 6:
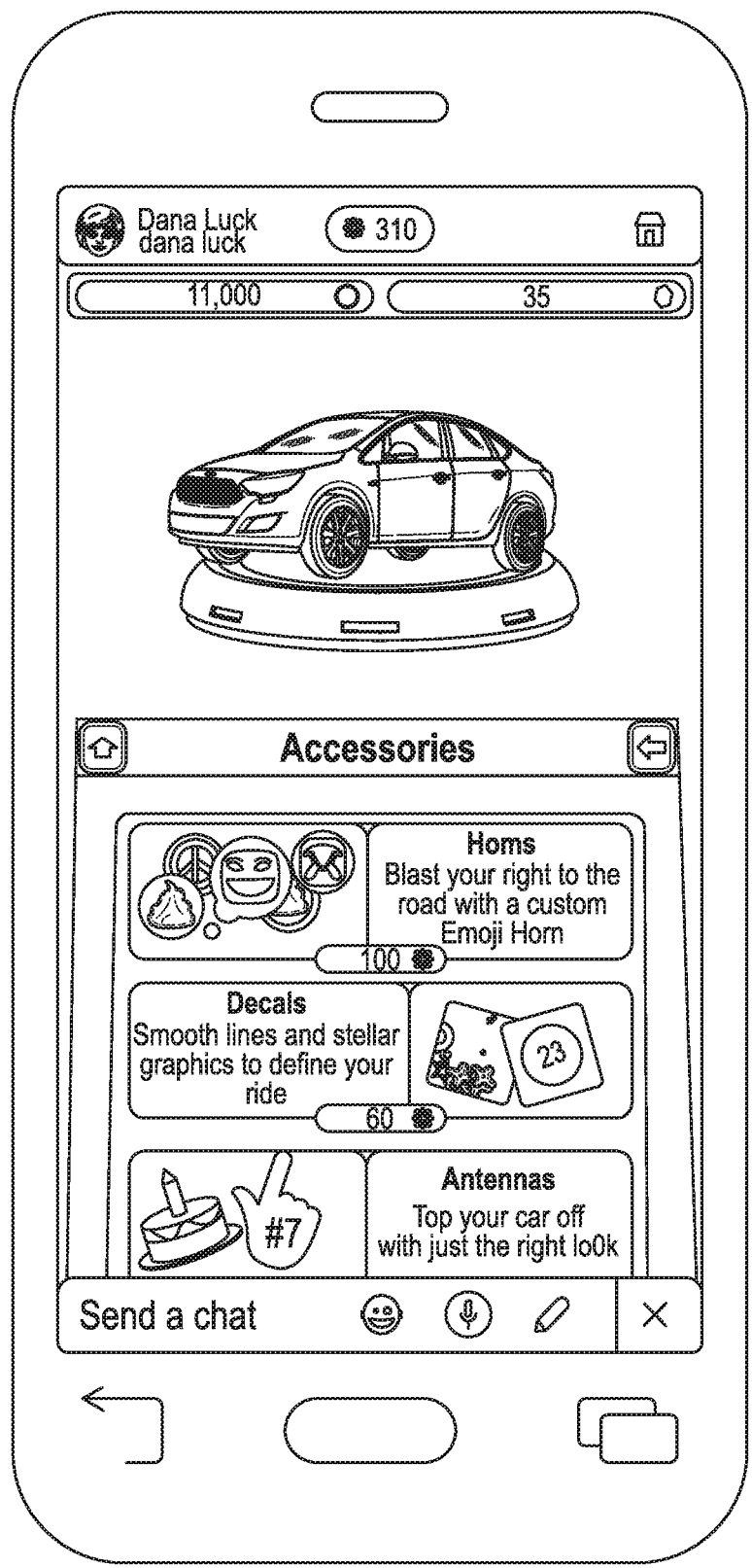
FIG. 6 shows one example of a game that includes a storefront with sellable items, according to some embodiments.

FIG. 6 shows one example of a web-based gaming application that includes a storefront with sellable items. At the top of the screen, a user identifier is presented (e.g., Dana together with an avatar of the user) and a balance of the token wallet 309 associated with the user (e.g., 310 tokens) Below that information presented by the messaging client application 104 is the list of items available for purchase, which is displayed by the web-based gaming application. A user can tap or select any listed item to have the web-based gaming application generate and send a purchase request for the corresponding item to the messaging client application 104. The messaging client application 104 completes the purchase transaction, which enhances security of the user's payment information and personal information and prevents such information from being exposed or provided to the web-based gaming application. In some cases, at the bottom of the screen, other features of the messaging client application 104 may be presented, such as a chat interface or other options that enable a user to communicate with other users of the messaging client application 104. None of the information displayed at the top or the bottom of the screen that is presented by the messaging client application 104 is visible or available to the web-based gaming application. This further enhances security of the user information and limits what information is available to the web-based gaming application.

Figure 7:
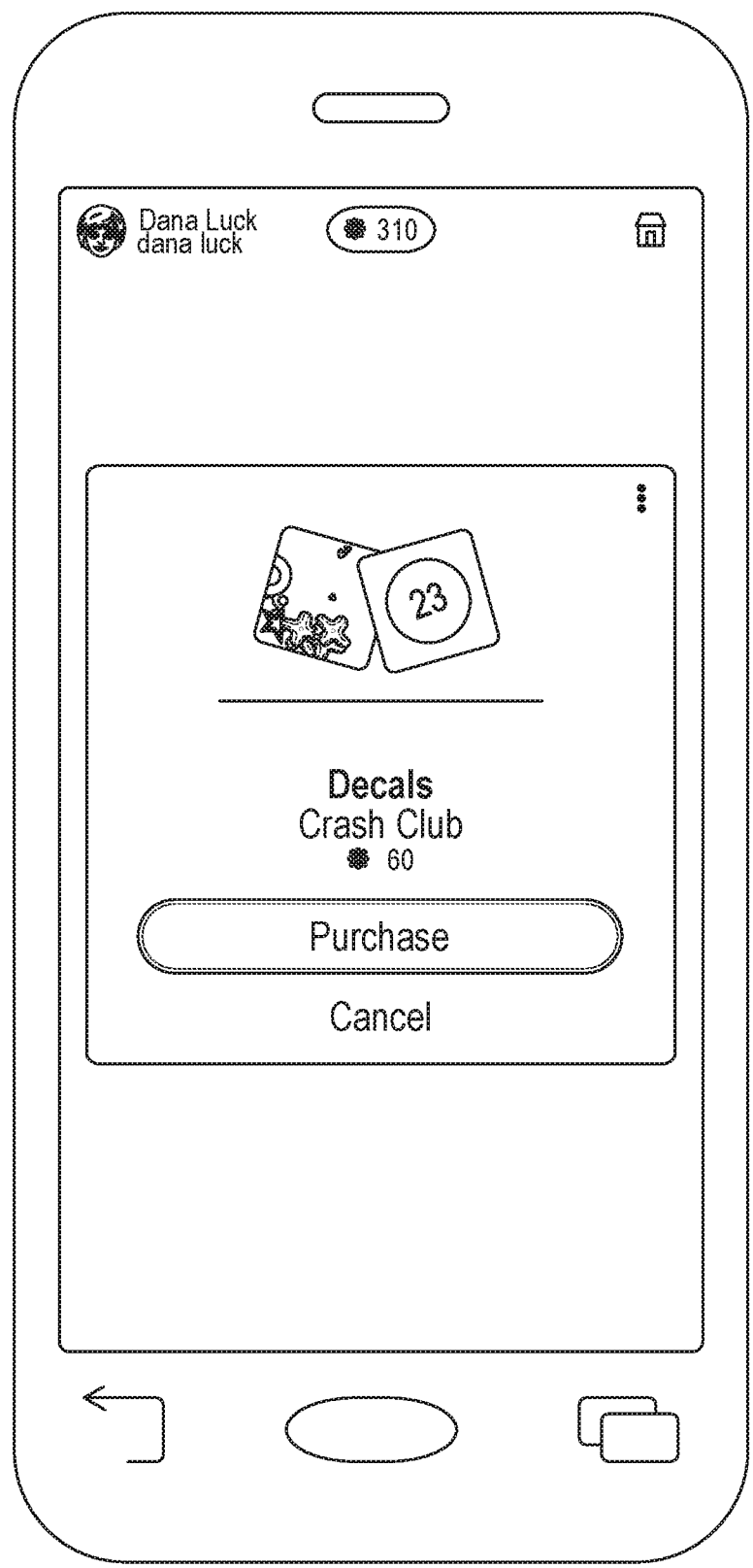
FIG. 7 shows an example of a purchase dialog when decals are purchased from a storefront within a game, according to some embodiments.

FIG. 7 shows an example of a purchase dialog when an item (e.g., decals) are requested to be purchased from a storefront within a web-based gaming application. As an example, the web-based gaming application may receive a user selection of the decals item from the screen shown in FIG. 6. In response, a purchase transaction request with the decals item information is sent to the messaging client application 104. After verifying authenticity of the item (e.g., by checking that attributes such as cost of the item satisfy one or more verification criteria, such as the attributes match expected attributes, or are within a predefined range of the expected attributes, such as an expected cost of the item maintained in the item data 307), the messaging client application 104 presents a prompt identifying the selected item to the user and requesting that the user confirm the purchase. The prompt may provide the name of the item, the name of the web-based gaming application from which the request was received, the price or cost in tokens for the item, and any other suitable information. In response to receiving a user selection of a purchase option from the prompt, the messaging client application 104 may proceed to complete the purchase transaction by deducting the amount of tokens for the item from the token wallet of the user and generating a purchase transaction identifier for transmission to the web-based gaming application.

The messaging client application 104 may check to see if the user has sufficient tokens or currency in the token wallet to complete purchase. This may be performed before or after the purchase prompt is presented to the user in FIG. 7. To accomplish this, the messaging client application 104 receives the ItemID requested from the web-based gaming application and checks the locally stored balance in the token wallet 309 against the cost or price for the item that is stored in item data 307. If the token wallet 309 balance is greater than the cost or price of the item, the messaging client application 104 proceeds to complete the purchase transaction. Otherwise, if the token wallet 309 balance is less than the cost or price of the item, the messaging client application 104 sends a message to the web-based gaming application indicating insufficient funds are available. In addition or alternatively, the messaging client application 104 navigates the user to a GUI of the messaging client application 104 to allow the user to purchase additional tokens to complete the transaction.

To process payment for the item, the messaging client application 104 calls a DebitRequest API function with the following parameters: Transact, Transaction ID, user identifier, and price or cost (Debit Amount). A debit service then performs the following: verifies sufficient user balance in the token wallet 309 and determines the highest value bundles from which to deduct tokens. Namely, the debit service deducts values from the tokens available in the token wallet 309 based on token class and creation date. The debit system selects as many token bundles or subsets as needed to cover the total purchase price in tokens.

In some cases, the hierarchy of token subset selection is: paid tokens get deducted first, followed by promotional tokens, and then earned tokens. In particular, the token balance in the wallet 309 is deducted in a way that depletes paid tokens first, and then when all the paid tokens are depleted, depletes promotion tokens. After all the paid and promotion tokens are depleted, the earned tokens are depleted.

To deplete or deduct token values, the debit service starts depleting tokens associated with the paid class (the tokens associated with the highest value bundles or subsets) first, defined by USD (U.S. dollars) Value per Token. Within those bundles or subsets, the tokens with the oldest creation date (as indicated by the table shown in FIG. 8) are depleted first. After all of the paid tokens are deleted, the debit service determines the balance left in the cost or price of the item. Namely, the debit service deducts from the cost or price of the item the total paid tokens that were debited and determines how much is left in the cost or price of the item. If anything is left, the debit service accesses and begins depleting tokens associated with a second class until the total cost or price of the item is reached. The debit service starts depleting the promotional tokens based on oldest creation date. Once all of those tokens are depleted, if any balance remains to be paid on the cost or price of the item, the debit service deducts tokens associated with the earned class based on their creation dates.

In some cases, the price or cost of the item is less than the total number of tokens available in a given subset (e.g., the cost of the item is less than the total number of tokens purchased on a given date). In such cases, the debit service splits the given subset into two components, one of which is equal to the price or cost of the item. The component with the number of tokens equal to the price or cost of the item is depleted first, and the second component with the remaining number of tokens remains stored in the wallet.

If the purchase is successful, a successful indication is returned to the third-party application and may include: TransactionToken, TransactionTimestamp, ProjectID, user identifier, ItemID (item identifier), Item_Version, Price, and/or a Transaction Status.

Step 6 of FIG. 5B describes how a web-based gaming application consumes a purchase. After receiving confirmation of a successful transaction, the web-based gaming application consumes the item prior to releasing the item or making it available for use to the end user. This allows the item to be purchasable again. To achieve this, the web-based gaming application calls the ConsumePurchase API function, passing some or a portion of the purchase transaction information, such as the TransactionToken. The server receives the purchase transaction information from the web-based gaming application and changes the state of the item in the item data 307 to consumed. The API function call returns an indication of whether the consume process was successful to the web-based gaming application.

Step 7 of FIG. 5B is a Reward Release (with Server Verification) step. The web-based gaming application calls a trusted game server and requests release of the item. The game server verifies the item against its internal records by validating that the ItemIDs match and ensuring that the transactionID does not match anything previously purchased/released. The game server instructs the web-based gaming application to release the item to user.

Figure 9:
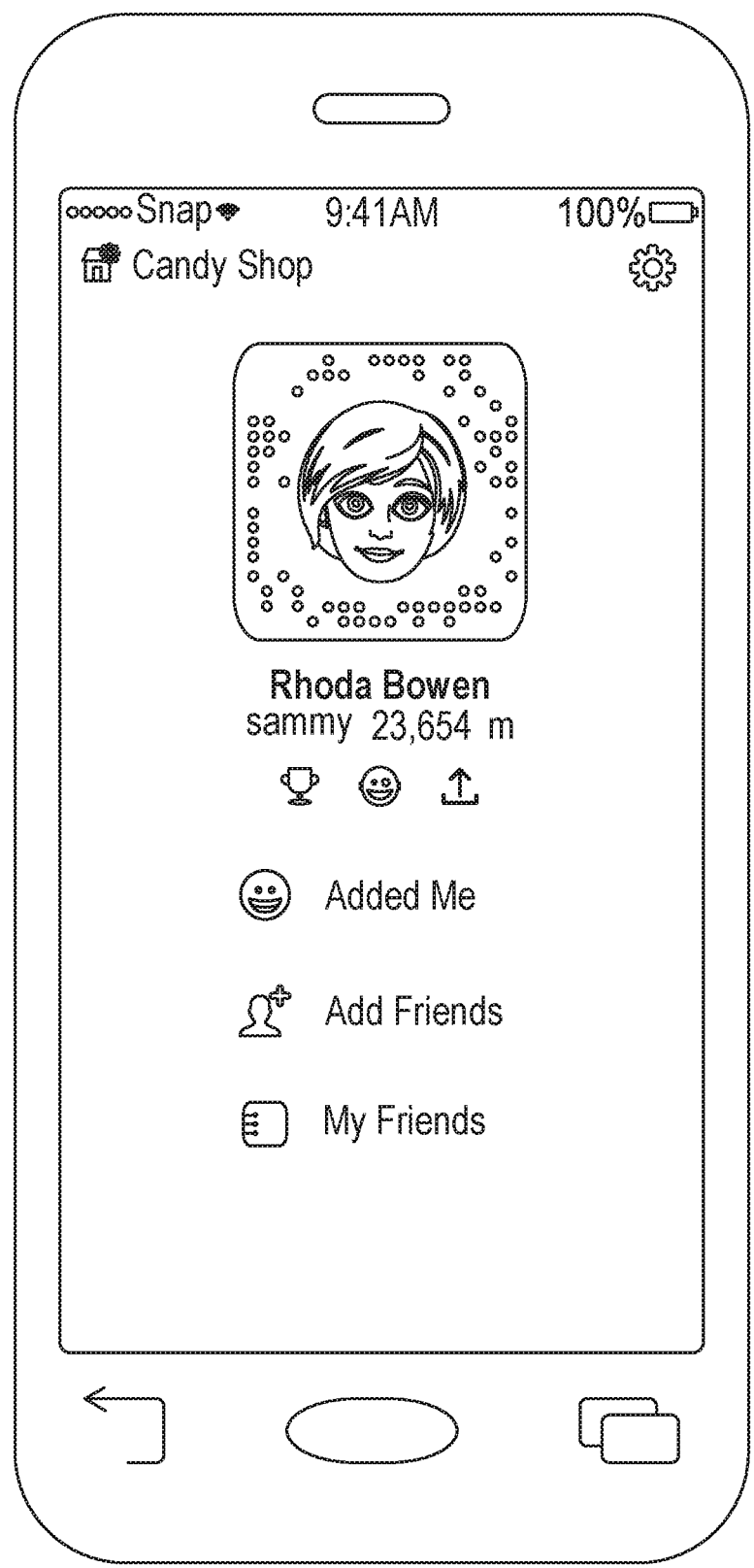
FIG. 9 shows an example of a user profile interface that may be implemented in at least some of the disclosed embodiments.

FIG. 9 shows an example of a user profile interface that may be implemented in at least some of the disclosed embodiments. The user profile interface is provided by the messaging client application 104 in response to receiving a user request to access the profile. The user profile interface includes an indicator of a store for purchasing tokens (e.g., candy shop). In response to receiving a user selection of the indicator, the messaging client application 104 navigates the user to a storefront for purchasing tokens.

Figure 10:
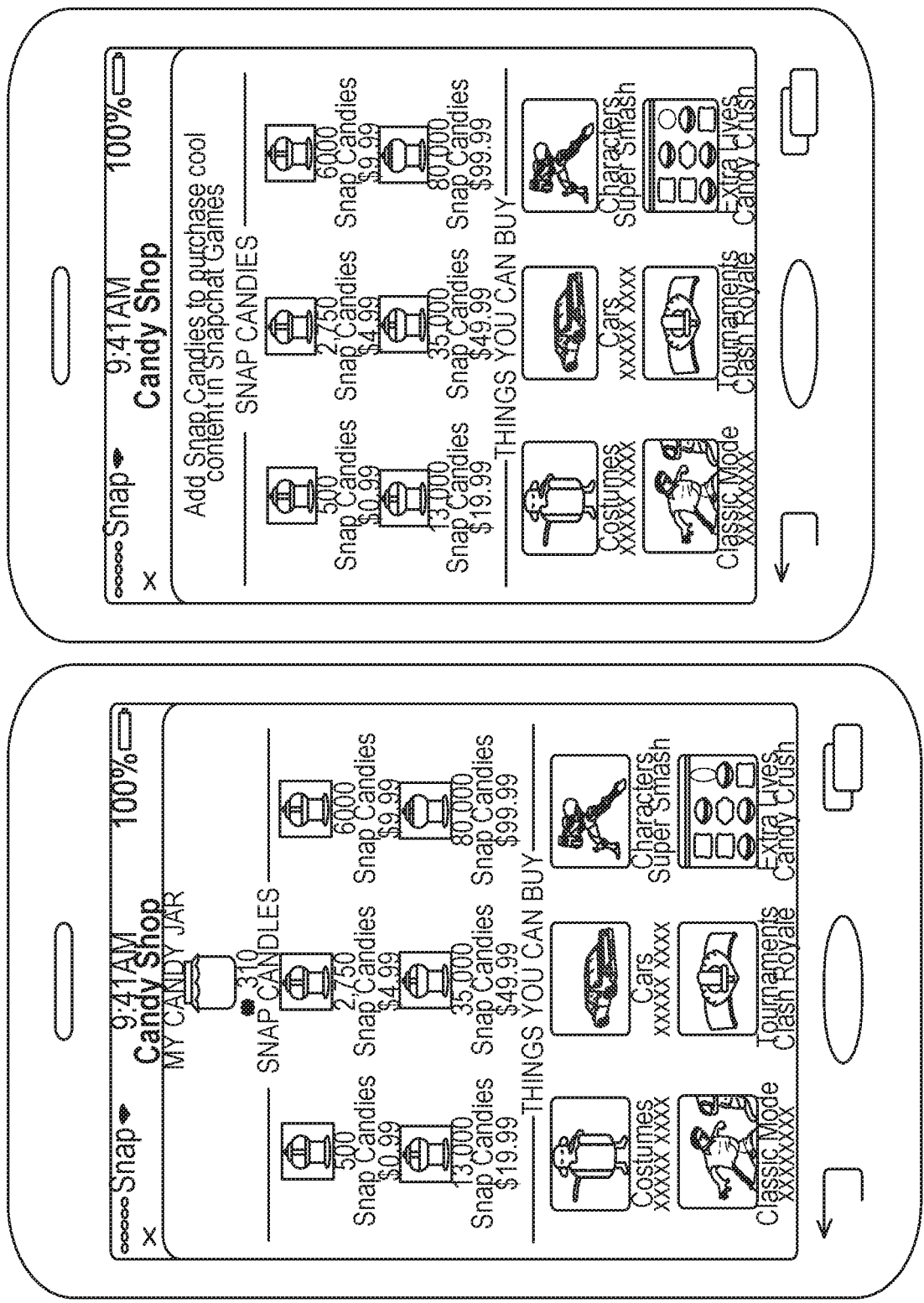
FIG. 10 shows two embodiments of storefronts that may be implemented in some of the disclosed embodiments. One embodiment includes a token balance and the other storefront does not display a token balance.

FIG. 10 shows two embodiments of storefronts for purchasing tokens that may be implemented in some of the disclosed embodiments. One embodiment (on the left) includes a token balance in the user token wallet and the other storefront (on the right) does not display a token balance. A list of different token bundles or subsets is presented (e.g., indicating the number of tokens available for purchase at a currency in the user's country). In response to receiving a user selection of a given token bundle or subset from the display, the messaging client application 104 navigates the user to a confirmation screen for confirming purchase of the token bundle.

Figure 11:
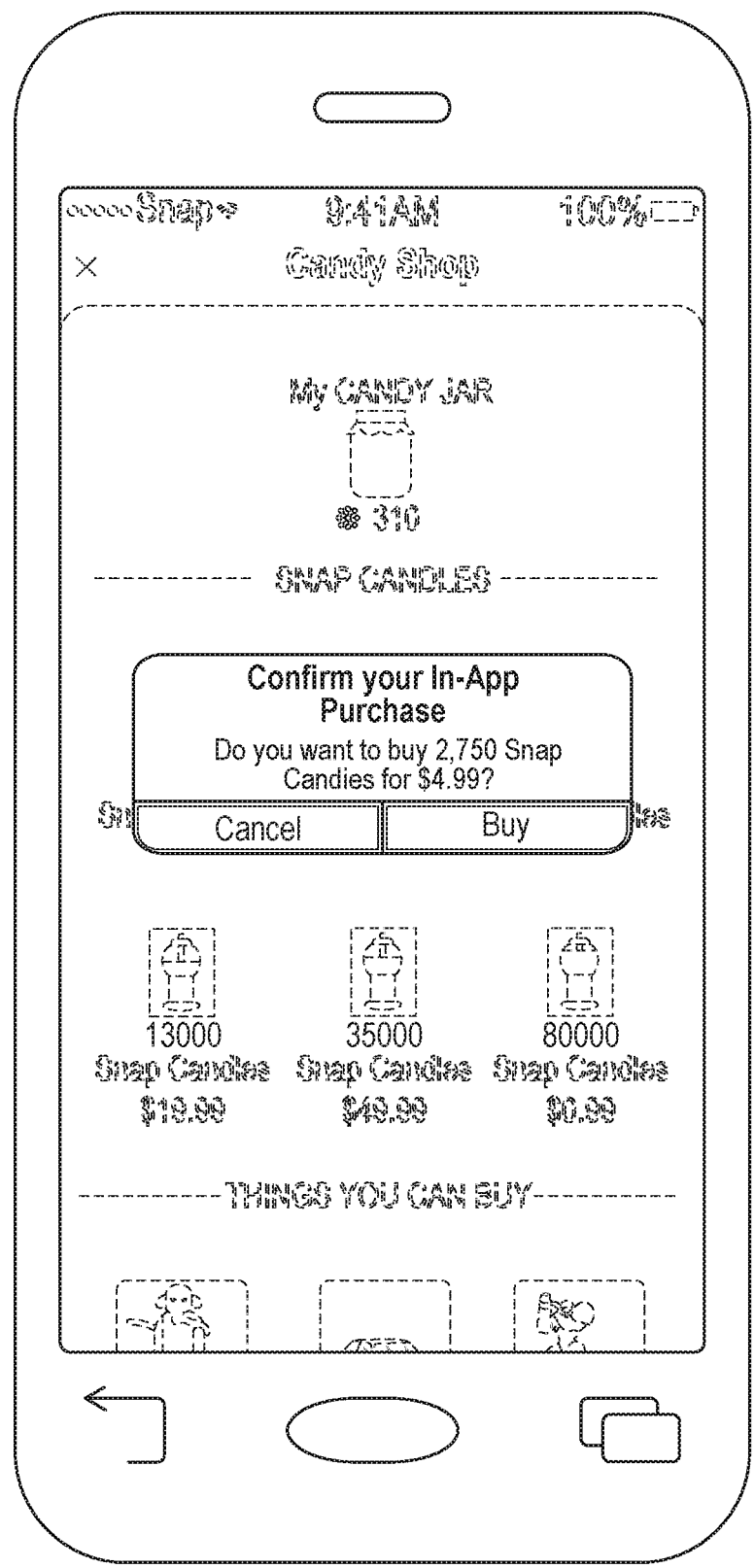
FIG. 11 shows a confirm purchase dialog that may be implemented in at least some of the disclosed embodiments.

FIG. 11 shows a confirm purchase dialog that may be implemented in at least some of the disclosed embodiments. The dialog indicates to the user the selected token bundle with the price in the currency in the user's country and the number of tokens to be purchased. In response to receiving a user selection of the buy option, the messaging client application 104 completes purchase of the bundle and adds the total number of tokens in the bundle to the token wallet. The tokens are stored and associated in the token wallet with the paid class along with the other information, such as the purchase date and currency amount shown in FIG. 8.

Figure 12:
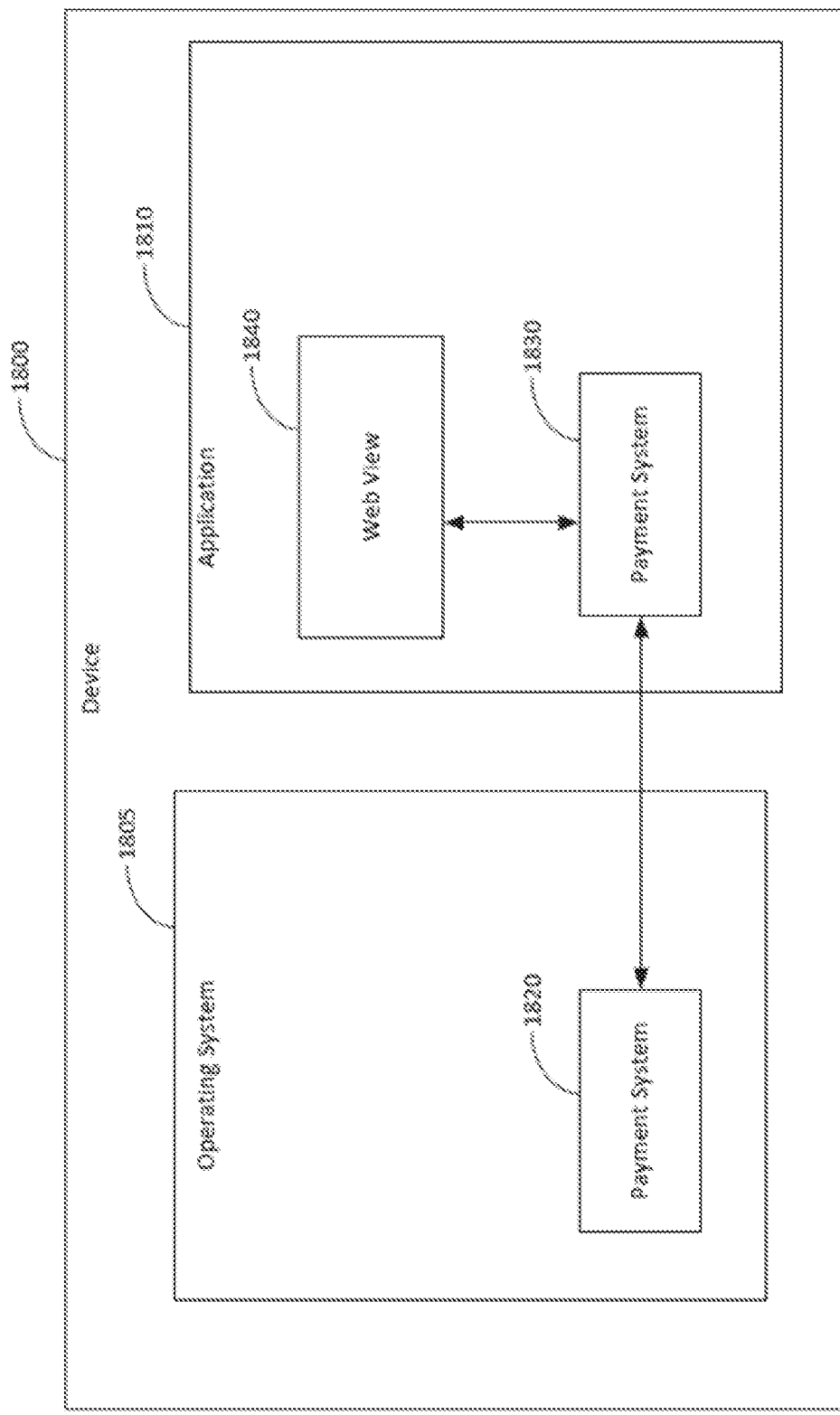
FIG. 12 is a block diagram showing the implementation of a virtual currency system within an application of a device, according to some embodiments.

FIG. 12 is a block diagram showing the implementation of a virtual currency system within an application of a device. FIG. 12 shows a device 1800. The device 1800 may be, in some embodiments, a mobile device such as a smart phone. The device 1800 includes an operating system 1805. Built into the operating system is a payment system 1820. The payment system 1820 may provide for monetary transactions within applications, such as the application 1810. The application 1810 also implements a payment system 1830. The payment system 1830 may purchase blocks of currency from the payment system 1820. For example, the payment system 1830 may perform a purchase transaction with the payment system 1820 of a first amount. The application 1810 also includes a web view application 1840. The web view application 1840 may perform purchase transactions with the payment system 1830, implemented within the application 1810. The purchase transactions by the web view application 1840 do not necessary cause a transaction between the payment system 1830 and payment system 1820. For example, a transaction between the web view application 1840 and the payment system 1830 may be for a second amount. The payment system 1830 may deduct the second amount from the first amount, which was obtained via the transaction with the payment system 1820. The payment system 1830 may then have a balance equivalent to the first amount minus the second amount. In other words, the payment system 1830 may perform block purchases from the payment system 1820 and maintain a rolling balance for use within the application 1810. In this way, the application 1810 is able to perform electronic transactions with applications hosted within the application 1810 without necessarily involving the payment system 1820 in every transaction. This may function, in some implementations, to a reduction in processing fees experienced by the application 1810, due to the reduced number of transactions that occur with the payment system 1820, while still making available financial transactions to applications hosted within the application 1810.

Figure 13:
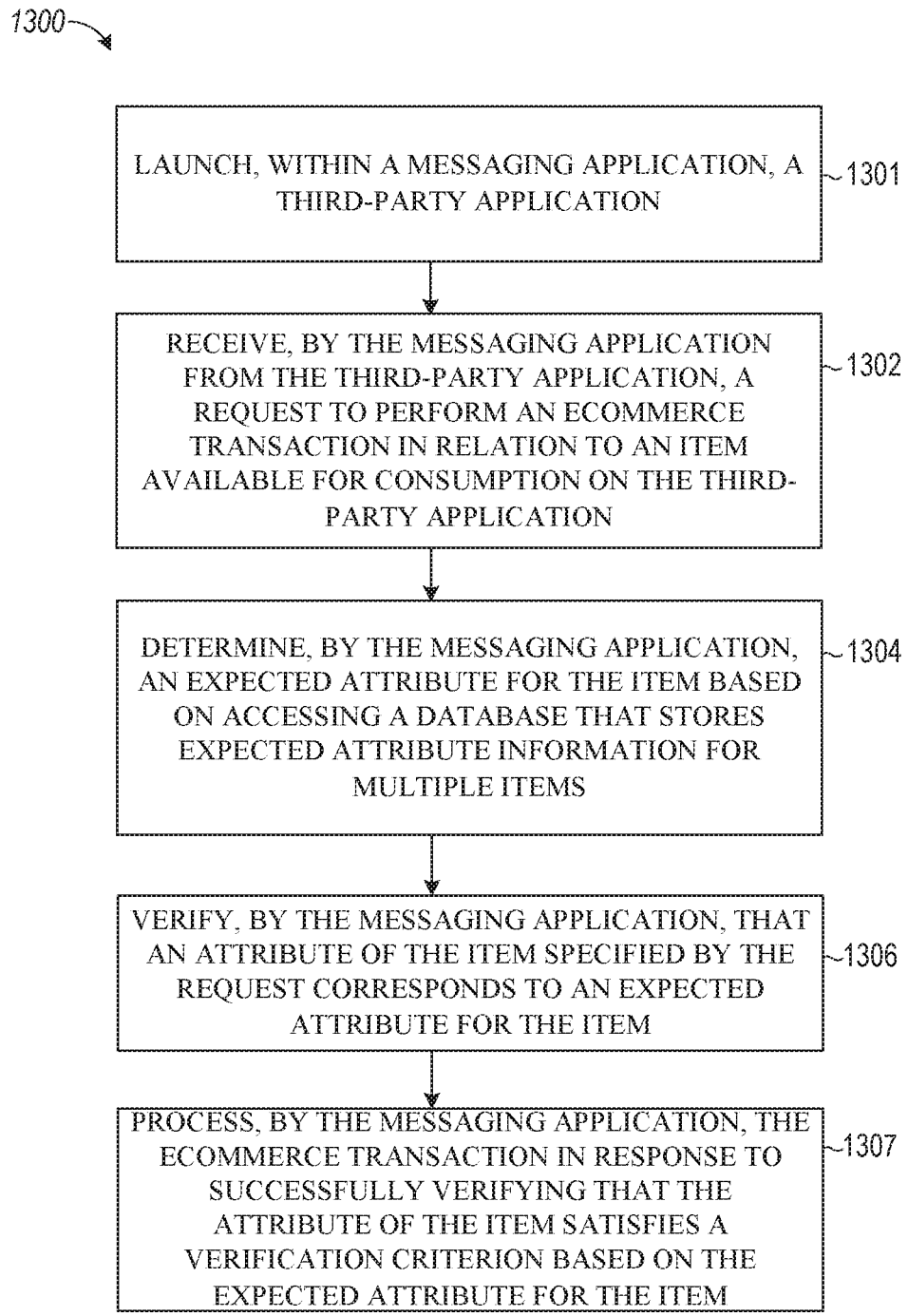
FIG. 13 is a flowchart of a process that may be performed in one or more of the disclosed embodiments.

FIG. 13 is a flowchart of a method that may be performed in one or more of the disclosed embodiments.

In operation 1301, the messaging client application 104 launches a third-party application.

In operation 1302, the messaging client application 104 receives from the third-party application a request to perform an ecommerce transaction in relation to an item available for consumption on the third-party application.

In operation 1304, the messaging application determines an expected attribute for the item based on accessing a database that stores expected attribute information for multiple items.

In operation 1306, the messaging client application 104 verifies that an attribute of the item specified by the request corresponds to the expected attribute for the item.

In operation 1307, the messaging client application 104 processes the ecommerce transaction in response to successfully verifying that the attribute of the item satisfies a verification criterion based on the expected attribute of the item.

Software Architecture

Figure 14:
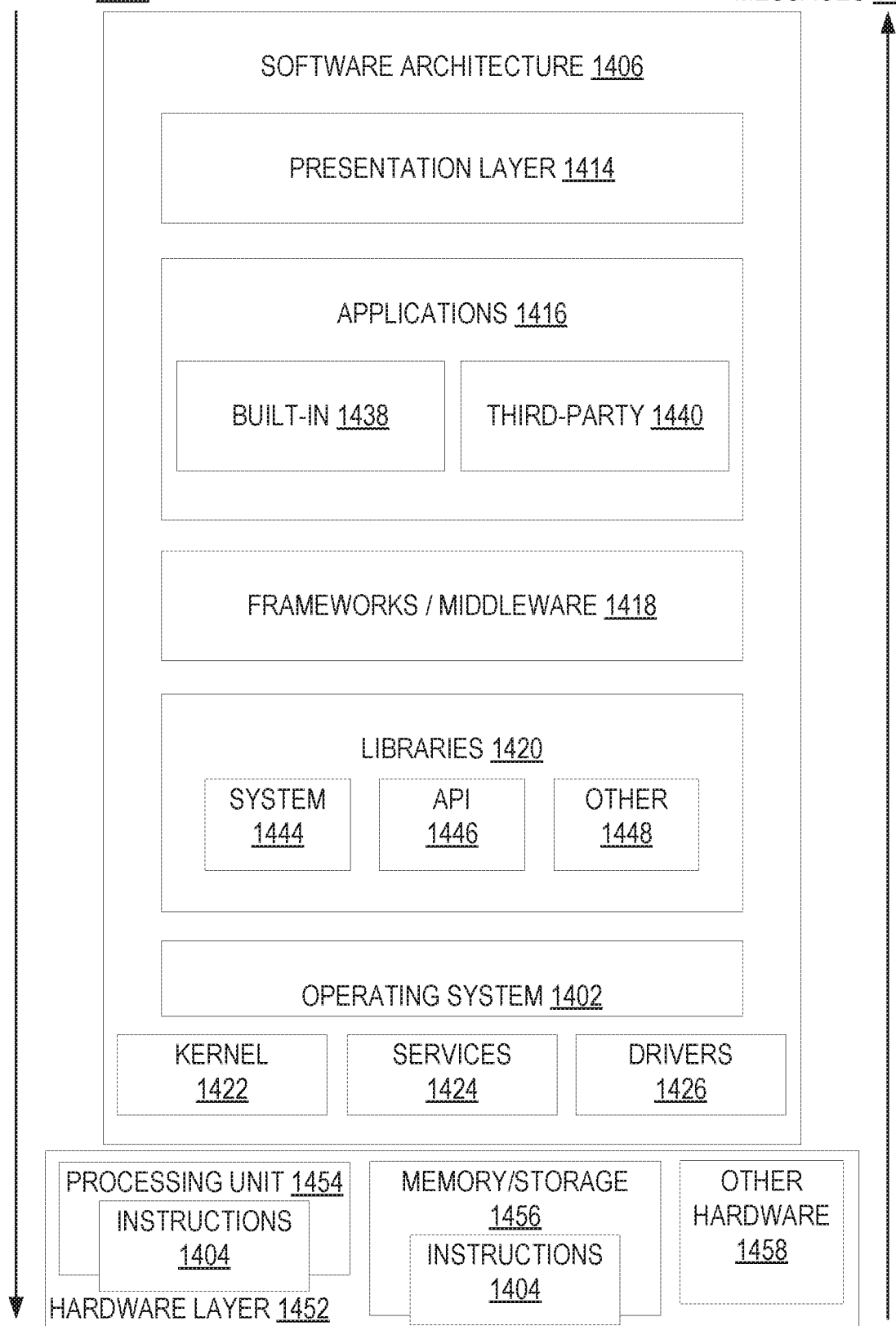
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as a machine 1500 of FIG. 15 that includes, among other things, processors 1504, memory/storage 1506, and I/O components 1518. A representative hardware layer 1552 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes memory and/or storage 1456, which also have the executable instructions 1404. The hardware layer 1452 may also comprise other hardware 1458.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 14, the software architecture 1406 may be conceptualized as a stack of layers where each layer provides particular functionality. For example, the software architecture 1406 may include layers such as an operating system 1402, libraries 1420, frameworks/middleware 1420, applications 1416, and a presentation layer 1414. Operationally, the applications 1416 and/or other components within the layers may invoke API calls 1408 through the software stack and receive a response as messages 1410. The layers illustrated are representative in nature and not all software architectures have all layers. For example, some mobile or special-purpose operating systems may not provide a frameworks/middleware 1418 layer, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 provide a higher-level common infrastructure that may be used by the applications 1416 and/or other software components/modules. For example, the frameworks/middleware 1418 may provide various GUI functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ SDK by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1416 may use built-in operating system functions (e.g., kernel 1422, services 1424, and/or drivers 1426), libraries 1420, and frameworks/middleware 1418 to create user interfaces to interact with users of the system. Alternatively, or additionally, in some systems interactions with a user may occur through a presentation layer, such as the presentation layer 1414. In these systems, the application/component "logic" can be separated from the aspects of the application/component that interact with a user.

Exemplary Machine

Figure 15:
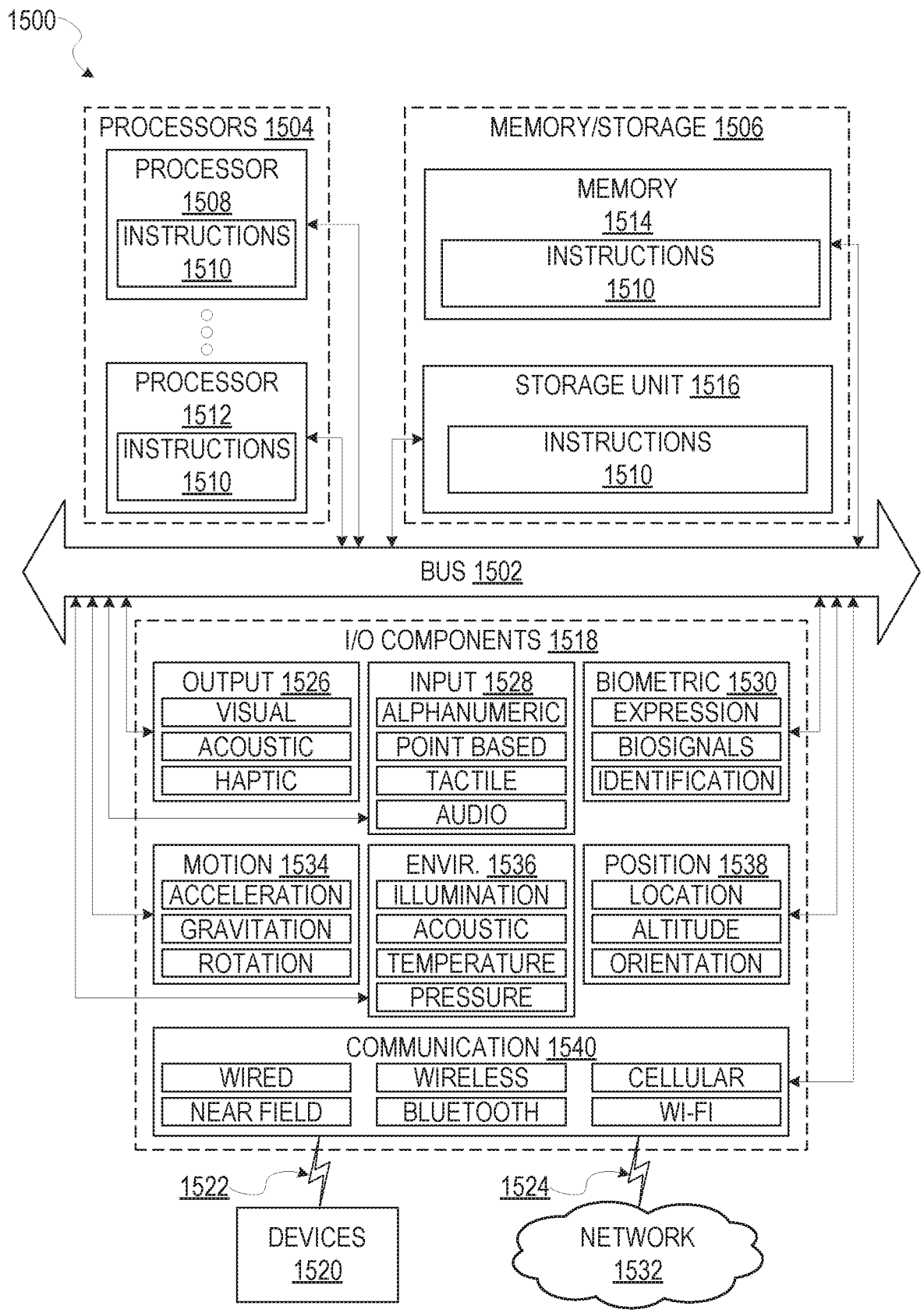
FIG. 15 is a block diagram illustrating components of a machine, according to some exemplary embodiments, able to read instructions from a machine-readable medium (e.g., a machine-readable storage medium) and perform any one or more of the methodologies discussed herein.

FIG. 15 is a block diagram illustrating components (also referred to herein as "modules") of a machine 1500, according to some exemplary embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of the processors 1504 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1518 may include a wide variety of components to provide a user interface for receiving input, providing output, producing output, transmitting information, exchanging information, capturing measurements, and so on. The specific I/O components 1518 that are included in the user interface of a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various exemplary embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1528 may also include one or more image-capturing devices, such as a digital camera for generating digital images and/or video.

In further exemplary embodiments, the I/O components 1518 may include biometric components 1530, motion components 1534, environment components 1536, or position components 1538, as well as a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via a coupling 1524 and a coupling 1522, respectively. For example, the communication components 1540 may include a network interface component or other suitable device to interface with the network 1532. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method comprising:
    launching, within a messaging application, a third-party application by retrieving a markup language file associated with the third-party application and executing the markup language file;
    establishing a communication bridge comprising two one-way communication channels between the third-party application and the messaging application, the communication bridge enabling messages to be exchanged between the third-party application and the messaging application asynchronously;
    receiving, using an application programming interface (API) function of the messaging application associated with a purchase transaction from the third-party application, a request, via the communication bridge, to perform an ecommerce transaction in relation to an item available for consumption on the third-party application;
    determining, by the messaging application, an expected attribute for the item based on accessing a database that stores expected attribute information for multiple items by obtaining a list, maintained by the messaging application, of items available for purchase by the third-party application and corresponding expected costs and identifying the item and the corresponding expected cost in the list;
    verifying, by the messaging application, that an attribute of the item specified by the request corresponds to the expected attribute for the item by determining that a cost of the item specified by the request is within a predefined range of the expected cost associated with the item in the list obtained by the messaging application; and
    processing, by the messaging application, the ecommerce transaction in response to successfully verifying that the attribute of the item satisfies a verification criterion based on the expected attribute for the item by accessing a virtual wallet maintained by the messaging application and deducting the cost of the item from the virtual wallet to generate a transaction identifier.

2. The method of claim 1, wherein the third-party application is a web-based application; and
    wherein the verification criterion comprises that the attribute of the item is within a predefined range of the expected attribute.

3. The method of claim 1, wherein processing the ecommerce transaction comprises determining a balance of the messaging application based on the ecommerce transaction.

4. The method of claim 1, wherein the attribute includes at least one of the cost, an identifier of the item, an identifier of the third-party application, an identifier of a country, or an identifier of a user.

5. The method of claim 1, wherein verifying that the attribute of the item specified by the request corresponds to the expected attribute for the item comprises:
    retrieving the attribute of the item from the request;
    retrieving, from the database maintained by the messaging application, the expected attribute based on an identifier of the third-party application and an identifier of the item; and
    comparing the expected attribute to the attribute retrieved from the request.

6. The method of claim 1, further comprising:
    preventing processing of the ecommerce transaction in response to determining that the attribute fails to match the expected attribute; and
    transmitting, via the communication bridge, a rejection to the third-party application indicating that the ecommerce transaction has not been processed.

7. The method of claim 6, wherein the rejection indicates at least one of insufficient funds, a duplicate purchase, an invalid quoted price, a disabled item, an item disabled for a country, or a stale item.

8. The method of claim 1, wherein processing the ecommerce transaction comprises:
    accessing a token balance for a user by the messaging application;
    determining that the token balance exceeds the cost for the item;
    deducting the cost for the item from the token balance;
    storing the transaction identifier in response to deducting the cost for the item from the token balance; and
    providing, via the communication bridge, confirmation to the third-party application indicating that the ecommerce transaction processed successfully, the confirmation comprising the transaction identifier.

9. The method of claim 8, further comprising:
    communicating, by the third-party application via the communication bridge, the transaction identifier to a server; and
    in response to the server determining that the transaction identifier matches a previously generated transaction identifier, enabling the third-party application to consume the item.

10. The method of claim 9, wherein the third-party application is enabled to consume the item in response to determining that the transaction identifier has not previously been consumed, further comprising marking the previously generated transaction identifier as consumed.

11. The method of claim 9, wherein the transaction identifier is provided to the third-party application when the third-party application is initially launched and generates a request to the messaging application to retrieve a list of unconsumed purchases.

12. The method of claim 8, wherein deducting the cost from the token balance comprises:

storing a plurality of subsets of tokens as part of the token balance for the user, each of the plurality of subsets of tokens being associated with a different token class of a plurality of token classes; and maintaining for each subset of tokens information that identifies the subset, a token transaction identifier, the token class, a token count, a country, a local currency value, a local currency identifier, and a creation date.

13. The method of claim 12, wherein a first token class of the plurality of token classes is a paid tokens class, wherein a second token class of the plurality of token classes is a promotional token class, wherein a third token class of the plurality of token classes is an earned tokens class, and wherein a fourth token class of the plurality of token classes is a sponsored tokens class.

14. The method of claim 12, further comprising adding a package of tokens to a subset of the plurality of tokens associated with a paid tokens class in response to receiving a user request with the messaging application to purchase the package of tokens.

15. The method of claim 12, further comprising deducting an amount of tokens from one or more of the subsets of tokens corresponding to the cost in accordance with the token classes, wherein a first portion of the cost is deducted from a first subset of tokens associated with a first class; and wherein a second portion of the cost is deducted from a second subset of tokens associated with a second class, wherein the first class is ranked higher than the second class.

16. The method of claim 1, further comprising presenting a graphical user interface screen of the messaging application that allows the user to purchase one or more tokens in response to determining that the ecommerce transaction failed to process successfully.

17. A system comprising:
one or more processors configured to execute instructions stored in a memory to perform operations comprising:
launching, within a messaging application, a third-party application by retrieving a markup language file associated with the third-party application and executing the markup language file;
establishing a communication bridge comprising two one-way communication channels between the third-party application and the messaging application, the communication bridge enabling messages to be exchanged between the third-party application and the messaging application asynchronously;
receiving, using an application programming interface (API) function of the messaging application associated with a purchase transaction from the third-party application, a request, via the communication bridge, to perform an ecommerce transaction in relation to an item available for consumption on the third-party application;
determining, by the messaging application, an expected attribute for the item based on accessing a database that stores expected attribute information for multiple items by obtaining a list, maintained by the messaging application, of items available for purchase by the third-party application and corresponding expected costs and identifying the item and the corresponding expected cost in the list;
verifying, by the messaging application, that an attribute of the item specified by the request corresponds to the expected attribute for the item by determining that a cost of the item specified by the request is within a predefined range of the expected cost associated with the item in the list obtained by the messaging application; and
processing, by the messaging application, the ecommerce transaction in response to successfully verifying that the attribute of the item satisfies a verification criterion based on the expected attribute for the item by accessing a virtual wallet maintained by the messaging application and deducting the cost of the item from the virtual wallet to generate a transaction identifier.

18. The system of claim 17, wherein the third-party application is a web-based application; and
wherein the verification criterion comprises that the attribute of the item is within a predefined range of the expected attribute.

19. A non-transitory computer readable medium comprising non-transitory computer readable instructions for performing operations comprising:
launching, within a messaging application, a third-party application by retrieving a markup language file associated with the third-party application and executing the markup language file;
establishing a communication bridge comprising two one-way communication channels between the third-party application and the messaging application, the communication bridge enabling messages to be exchanged between the third-party application and the messaging application asynchronously;
receiving, using an application programming interface (API) function of the messaging application associated with a purchase transaction from the third-party application, a request via the communication bridge, to perform an ecommerce transaction in relation to an item available for consumption on the third-party application;
determining, by the messaging application, an expected attribute for the item based on accessing a database that stores expected attribute information for multiple items by obtaining a list, maintained by the messaging application, of items available for purchase by the third-party application and corresponding expected costs and identifying the item and the corresponding expected cost in the list;
verifying, by the messaging application, that an attribute of the item specified by the request corresponds to the expected attribute for the item by determining that a cost of the item specified by the request is within a predefined range of the expected cost associated with the item in the list obtained by the messaging application; and
processing, by the messaging application, the ecommerce transaction in response to successfully verifying that the attribute of the item satisfies a verification criterion based on the expected attribute for the item by accessing a virtual wallet maintained by the messaging application and deducting the cost of the item from the virtual wallet to generate a transaction identifier.

20. The non-transitory computer readable medium of claim 19, wherein the third-party application is a web-based application; and
wherein the verification criterion comprises that the attribute of the item is within a predefined range of the expected attribute.

* * * * *